US010387041B2

(12) United States Patent
Nguyen et al.

(10) Patent No.: US 10,387,041 B2
(45) Date of Patent: Aug. 20, 2019

(54) DATA MIGRATION SYSTEM

(71) Applicant: salesforce.com, inc., San Francisco, CA (US)

(72) Inventors: Minh Nguyen, Union City, CA (US); Neeraj Ahuja, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 63 days.

(21) Appl. No.: 15/802,368

(22) Filed: Nov. 2, 2017

(65) Prior Publication Data

US 2019/0129616 A1    May 2, 2019

(51) Int. Cl.
*G06F 3/06* (2006.01)
*G06F 11/07* (2006.01)

(52) U.S. Cl.
CPC .......... *G06F 3/0605* (2013.01); *G06F 3/0647* (2013.01); *G06F 11/0727* (2013.01); *G06F 3/067* (2013.01)

(58) Field of Classification Search
CPC .. G06F 11/1458; G06F 3/0638; G06F 3/0647; G06F 3/067; G06F 11/1466; G06F 11/0727; G06F 3/605
USPC ........................................................ 711/165
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,133 | B1 | 4/2001 | Masthoff |
| 6,216,135 | B1 | 4/2001 | Brodersen et al. |
| 6,233,617 | B1 | 5/2001 | Rothwein et al. |
| 6,236,978 | B1 | 5/2001 | Tuzhilin |
| 6,266,669 | B1 | 7/2001 | Brodersen et al. |
| 6,288,717 | B1 | 9/2001 | Dunkle |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Hashem Farrokh
(74) *Attorney, Agent, or Firm* — Weaver Austin Villeneuve & Sampson LLP

(57) ABSTRACT

Disclosed are some implementations of systems, apparatus, methods and computer program products for facilitating data migration. Data migration is customizable according to user-specified data formats. A data migration system monitors the data migration process and automatically retries data migration tasks that have failed. In addition, the results of data migration are reversed according to detected threshold conditions.

20 Claims, 10 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |

(56) References Cited

U.S. PATENT DOCUMENTS

| | | |
|---|---|---|
| 2013/0247216 A1 | 9/2013 | Cinarkaya et al. |
| 2014/0025640 A1* | 1/2014 | Prahlad ............... G06F 11/1458 707/654 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0357439 A1* | 12/2016 | Uehara ................. G06F 3/0604 |
| 2017/0351407 A1* | 12/2017 | Landefeld ............... G06T 19/00 |

* cited by examiner

| Record Type: Alert 452 | 454 | 458 | 456 450 |
|---|---|---|---|

| Current Field | Field Type | New Field |
|---|---|---|
| Additional Info | Text | Alert Additional Info |
| Answer | Number | Alert Answer |
| Archived By | User | Alert Archived By |
| Archived Date | Date/Time | Alert Archived Date |
| Created Date | Date/Time | Alert Created Date |
| Chat Answer | Text | Alert Chat Answer |

FIGURE 4B

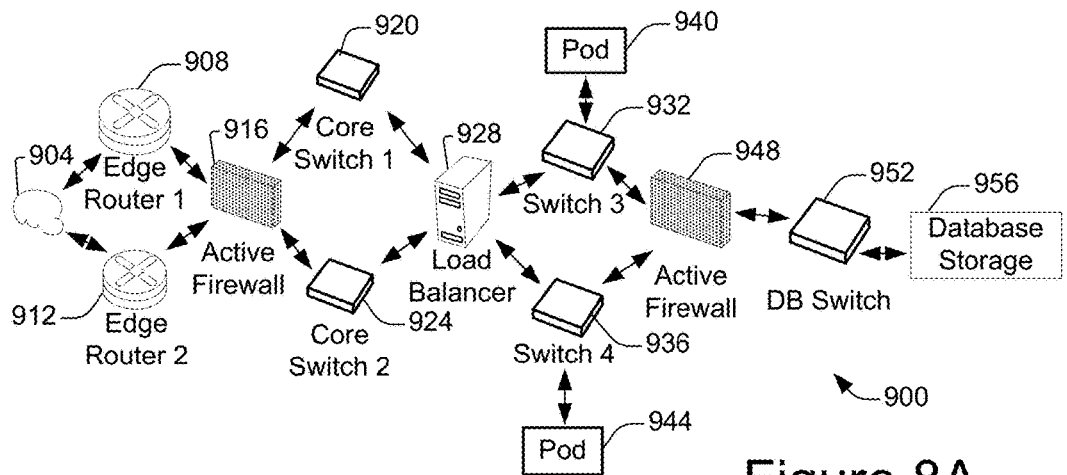
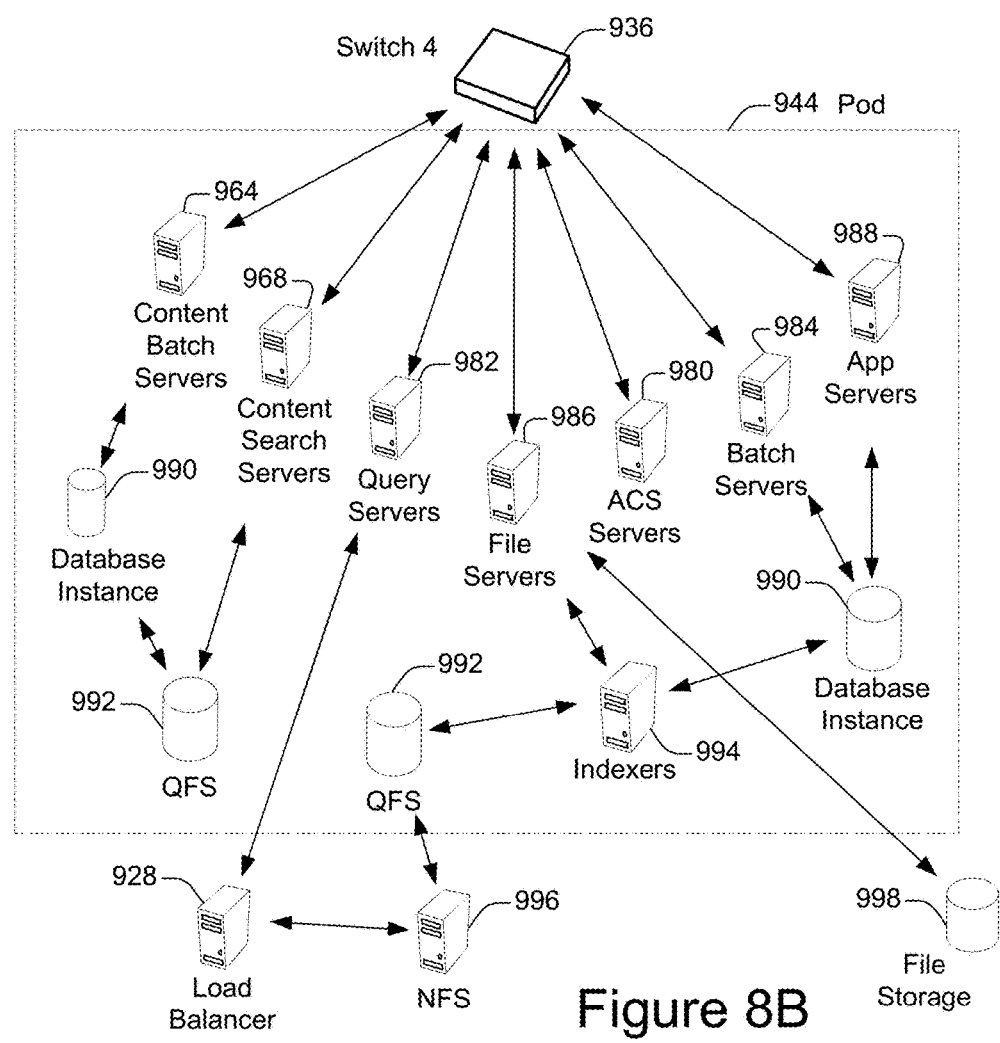
Figure 8A
Figure 8B

DATA MIGRATION SYSTEM

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with social networking systems, email systems, and instant messaging systems, by way of example, in a cloud computing environment.

Services that are offered to organizations can include data migration. Data migration is the process of transferring data between data storage systems, data formats, or computer systems. Data migration is usually performed programmatically to achieve an automated migration, freeing up human resources from tedious tasks. Data verification is typically performed after data migration is completed.

BRIEF DESCRIPTION OF THE DRAWINGS

The included drawings are for illustrative purposes and serve only to provide examples of possible structures and operations for the disclosed systems, apparatus, methods and computer program products for leveraging and managing assessment environments in an assessment hub. These drawings in no way limit any changes in form and detail that may be made by one skilled in the art without departing from the spirit and scope of the disclosed implementations.

FIG. 4B shows a diagram of an example data structure 450 for mapping source fields to destination fields, in accordance with some implementations.

FIG. 8A shows a system diagram of an example of architectural components of an on-demand database service environment 900, in accordance with some implementations.

FIG. 8B shows a system diagram further illustrating an example of architectural components of an on-demand database service environment, in accordance with some implementations.

DETAILED DESCRIPTION

Figure 1:
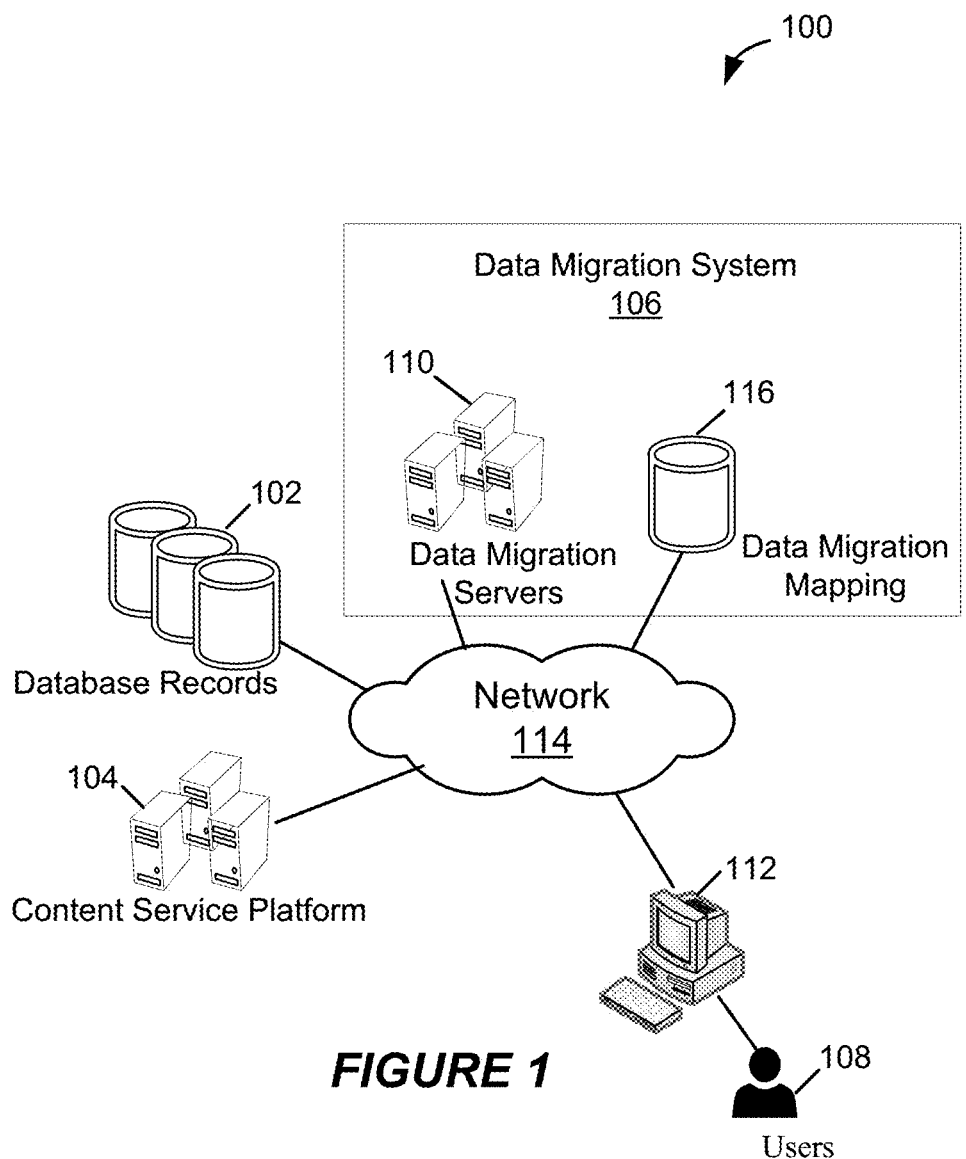
FIG. 1 shows a system diagram of an example of a database system 100 for data migration in a network environment, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

An organization may periodically update their database system to accommodate changes to the way data is gathered or used internally. For example, it may be desirable to modify the format of data that is maintained so that it is compatible with a particular software application. As another example, the organization may choose to merge data records of multiple record types to data records of a single record type.

Data migration is a process that can be used to transfer or copy data from one format to another format. Unfortunately, errors can occur during the data migration process. In addition, the results of data migration can have an unforeseen impact on other processes or applications.

Some implementations of the disclosed systems, apparatus, methods and computer program products are configured for facilitating user-configurable data migration. In some implementations, a mapping between source and destination data formats is generated and stored to guide an automated data migration process.

In some implementations, a data migration manager manages data migration tasks executed via a multi-threaded process. In some implementations, a retry manager monitors the status of the different data migration tasks and automatically retries those data migration tasks that have failed to successfully complete. In some implementations, an undo manager reverses the results of data migration to return data to its original format.

By way of illustration, John is an Information Technology (IT) employee within an IT group at an organization, Pyramid Construction, Inc. John has been asked to convert data from its current format to another format. More particularly, John has been asked to merge data that is stored as 7 different record types to 6 different record types to eliminate one of the record types that is no longer used by the organization. John accesses the organization's internal data migration system and maps each of the existing record types to a corresponding desired record type. For each of the record types, John maps each of the fields to a corresponding desired field.

John initiates the data migration process by submitting a request via the data migration system. The data migration system splits the data migration process into smaller independent tasks by dividing the existing data records into chunks and executes the independent tasks via a multi-threaded process across multiple servers.

A retry manager of the data migration system monitors the tasks for successful completion. During data migration, one of the servers fails and therefore 20 percent of the tasks do not successfully complete. The data migration system automatically retries the tasks that did not successfully complete.

An undo manager of the data migration system determines that data migration completes with 89% success. Since the 11% failure exceeds a 10% failure threshold, the undo manager reverses the data migration process to return the data to its original format.

Subsequently, the failed server is replaced and the data migration process is re-initiated. The data migration process completes successfully and a notification of the successful completion is transmitted to John.

FIG. 1 shows a system diagram of an example of a database system 100 for data migration in a network environment, in accordance with some implementations. Database system 100 includes a variety of different hardware and/or software components that are in communication with each other. In the non-limiting example of FIG. 1, database system 100 includes at least one content service database 102 storing database files, a content service platform 104, and data migration system 106. In accordance with various implementations, users 108 may access content service platform 104 to access a corresponding web site and its associated services.

Users 108 can include different users corresponding to a variety of roles and/or permissions. Examples of users include business users, technical users, and content generator users. Examples of devices 112 used by users include, but are not limited to a desktop computer or portable electronic device such as a smartphone, a tablet, a laptop, a wearable device such as Google Glass®, another optical head-mounted display (OHMD) device, a smart watch, etc.

Communication among components of database system 100 may be facilitated through a combination of networks 114 and interfaces. Database system 100 may handle and process requests from users 108 of database system 100. The requests from users 108 can include data requests, as well as requests to configure or initiate data migration.

Data migration system 106 is configured to enable a user to customize data migration, as will be described in further detail below with reference to FIGS. 2 and 3. Responsive to the user's customization preferences, a data migration mapping 116 that maps a data format of existing data records to a desired data format for new data records is generated and stored. An example of a data migration mapping will be described in further detail below with reference to FIGS. 4A and 4B.

Data migration system 106 includes data migration servers 110. In this example, data migration system 106 include three different computing systems or servers. However, it is important to note that this example is merely illustrative, and data migration system 106 may include any number of servers.

Data migration may be performed by multiple servers in parallel to expedite the data migration process. Multiple threads may simultaneously execute independent data migration tasks.

A data migration manager of data migration system 106 initiates data migration in response to a user request. More particularly, the data migration manager splits the data migration process into independent tasks that can be executed via a multi-threaded process.

In some implementations, at least a portion of the data records are flagged as read-only to ensure that data is not corrupted. After data stored in the flagged data records is migrated, the data records may be flagged to reflect their read/write status prior to data migration. The previous status may be a general status that applies globally. Alternatively, the previous status may vary according to a group or individual within the organization. For example, a record may have a read-only status for sales employee Samantha, but a read-write status for Jane since she is a manager of the sales group.

In some implementations, a user of content service platform 104 may have a single authorization identity. In other implementations, a user of content service platform 104 may have two or more different authorization identities. This can allow multiple modes of access to content or the data migration system, which can be based on private authorization or public authorization. For example, one authorization identity can be a set of access credentials for a sales group, enabling the sales group to have read-only access to database files. Another authorization identity can be a set of access credentials associated with managers, enabling the managers to have read-write access to at least a portion of the database files. Yet another authorization identity can be a set of access credentials for an IT group, enabling the IT group to access the data migration system.

During data migration, the status of each of the independent data migration tasks can be monitored. More particularly, at least one data migration status data structure can be maintained and updated in real-time. In the data structure, an indication of a data migration status can be maintained for each of the independent data migration tasks. For example, an indicator such as a single bit may indicate whether the corresponding data migration task has failed or successfully completed.

The data migration status data structure may be updated by the data migration manager of the data migration system 106 or a server that has been assigned a data migration task. An example data migration status data structure will be described in further detail below with reference to FIG. 5.

In some implementations, a retry manager monitors the progress of data migration. To monitor the progress of data migration in real-time, the retry manager can access the data migration status data structure. For example, the retry manager can monitor the data migration process by periodically accessing the data migration status data structure.

In some implementations, the retry manager is responsible for updating the data migration status data structure in real-time. Thus, the retry manager can determine the status of data migration for each of the tasks when the retry manager updates the data migration status data structure.

The retry manager may determine from the data migration status data structure that a subset of the data migration tasks has failed. The retry manager may automatically, without human intervention, initiate the execution of the failed data migration tasks. For example, the retry manager may assign the failed data migration tasks to servers of the data migration system 106. In some implementations, the retry manager can "retry" failed data migration task(s) immediately upon determination that the task(s) failed. In some implementations, the retry manager may "retry" failed data migration tasks periodically during data migration. In some implementations, the retry manager may retry failed data migration tasks after all of the data migration tasks have ended—either successfully or unsuccessfully.

In some implementations, data migration statistics are maintained and updated in real-time to reflect whether the data migration process is proceeding successfully. For example, data migration statistics can indicate a data migration time that has expired since the data migration was initiated, a number of data migration tasks that have failed to successfully complete, a number of data migration tasks that have successfully completed, a percentage of data migration tasks that have failed to successfully complete, a percentage of data migration tasks that have successfully completed, a number of data migration retry tasks that have successfully completed, a number of data migration retry tasks that have failed to successfully complete, a percentage of data migration retry tasks that have successfully completed, and/or a percentage of data migration retry tasks that have failed to successfully complete.

An undo manager can be configured to "undo" (e.g., reverse) the data migration process so that the data is returned to its original data format. The undo manager can initiate the undo process in response to a user request. Alternatively, the undo manager may initiate the undo process automatically without human intervention.

The undo manager may access the data migration status data structure and/or data migration statistics. In some implementations, the undo manager operates in real-time during data migration. In other implementations, the undo manager is initiated after data migration has been completed, suspended, or otherwise halted.

In some implementations, the undo manager may automatically initiate the undo process according to a set of rules and data migration statistics. More particularly, the retry rules may designate the conditions under which the undo manager automatically initiates the undo process to reverse the results of data migration. For example, a rule may include a condition that indicates that the undo manager is to reverse data migration if a threshold time for data migration has been exceeded. As another example, a rule may include a condition that indicates that the undo manager is to reverse data migration if the number or percentage of data migration tasks that have failed exceeds a threshold number or percentage.

In some implementations, data migration system 106 maintains the original database records 102 that store the data in its original format after data migration has successfully completed. In addition, data migration system 106 generates and stores new database records that store the data in the new record format according to the data migration mapping. The data migration system 106 may ultimately delete the original database records 102. The deletion may be performed in response to a user command or automatically (e.g., after a threshold period of time has elapsed since completion of the data migration). Various implementations of data migration system 106 will be described in further detail below.

Figure 2:
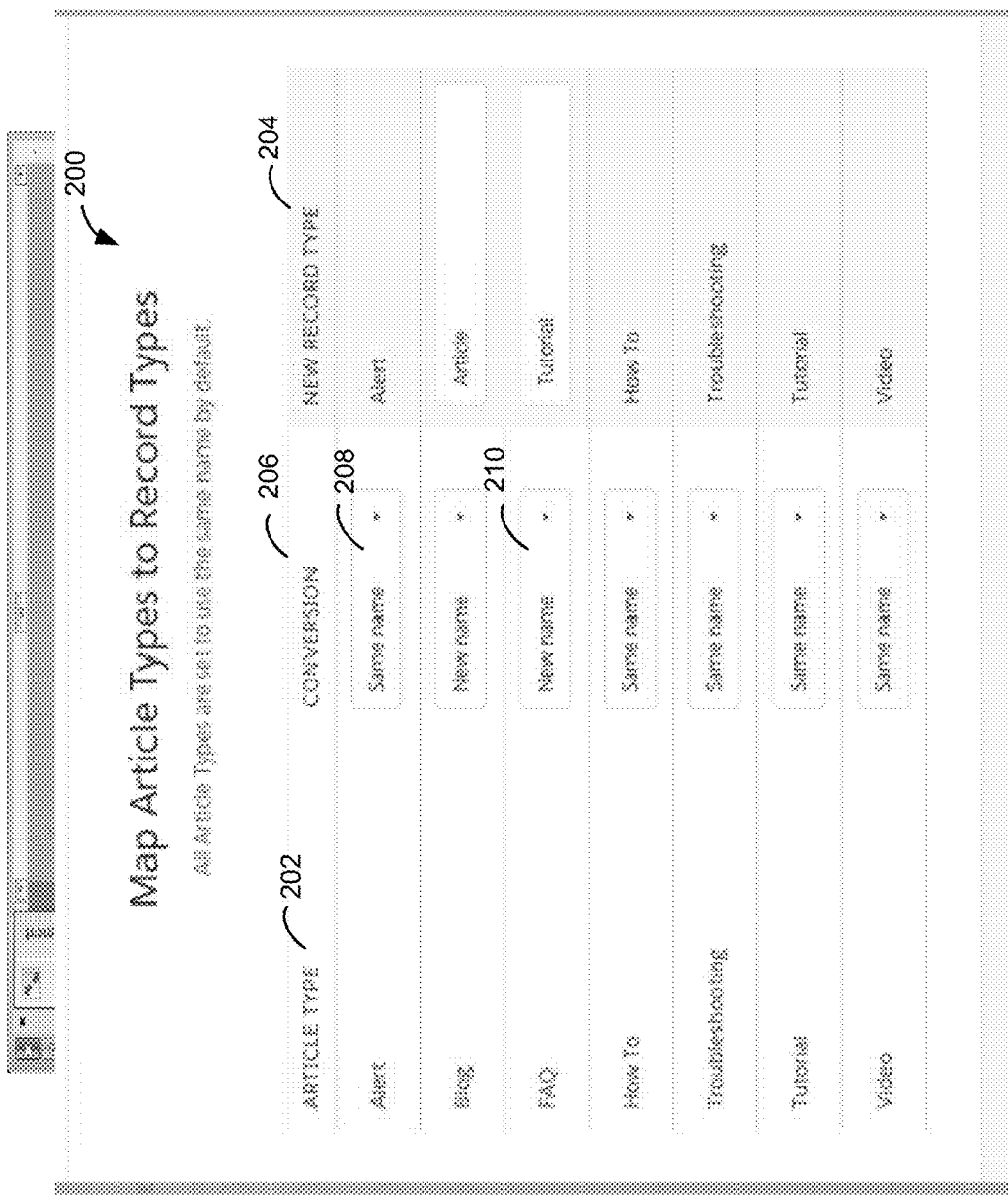
FIG. 2 shows an example of a graphical user interface (GUI) 200 for facilitating record type mapping, in accordance with some implementations.
Figure 3:
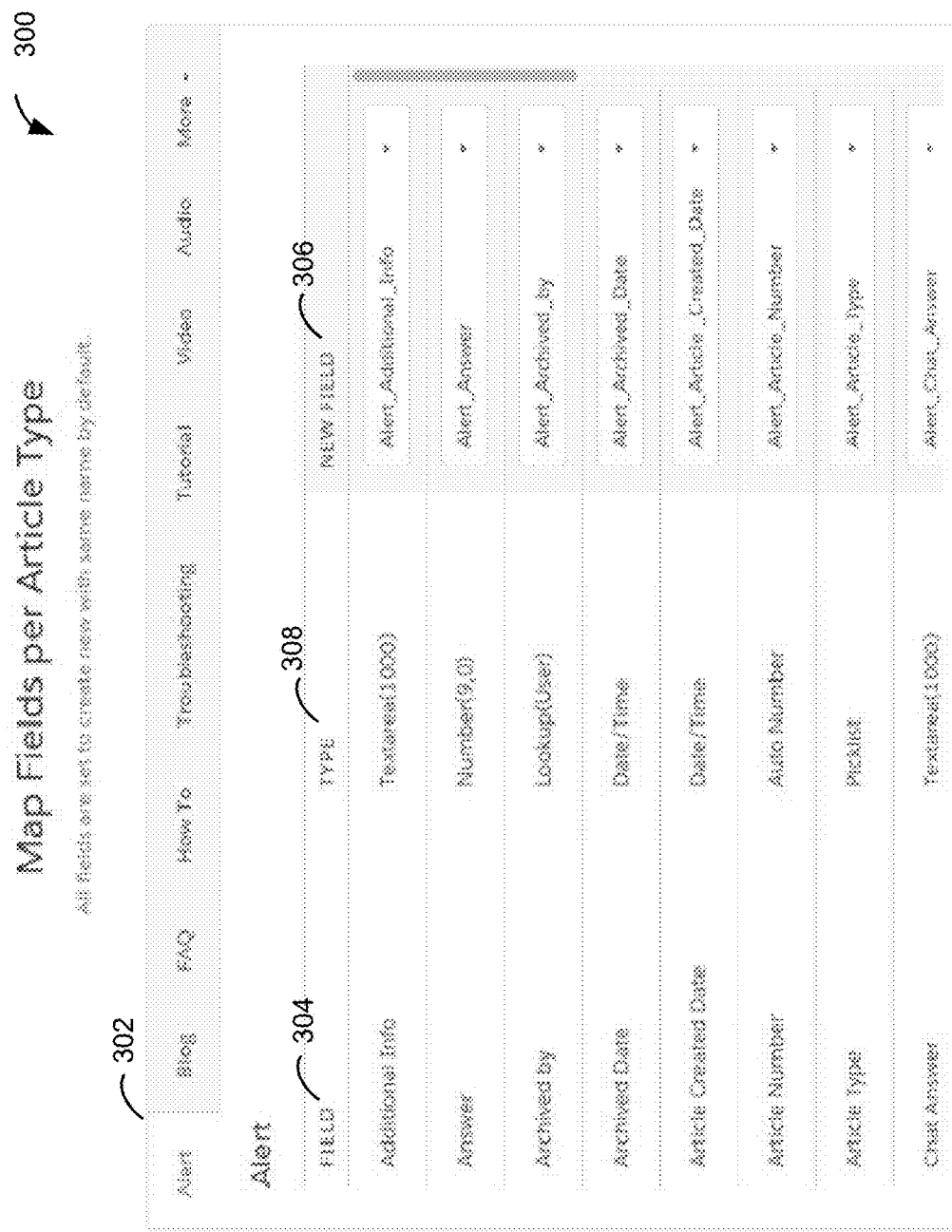
FIG. 3 shows an example of a GUI 300 for facilitating record field mapping, in accordance with some implementations.

FIG. 2 shows an example of a graphical user interface (GUI) 200 for facilitating record type mapping, in accordance with some implementations. GUI 200 is configured to present record types 202 of existing data records. In some implementations, a record type may correspond to an article type. As shown in this example, record types 202 can include Alert, Blog, FAQ, How To, Troubleshooting, Tutorial, and Video. For example, record types 202 may be presented in the form of a list, menu, tabs, or other suitable presentation.

For each of the record types 202, a user may select a desired new (e.g., replacement) record type 204 to which data for the existing record type is to be migrated. More particularly, GUI 200 is configured to provide, for each of the record types 202, an indication of a plurality of selectable options for the new record type 204. For example, the selectable options may be presented in the form of a drop-down menu. Record types 202 may be referred to as source record types, while record types 204 may be referred to as destination record types.

In some instances, a user may wish to consolidate the data into fewer data record types. Therefore, the new record type 204 that is selected by the user may be the same for two or more existing record types 202.

For some record types, the user may wish to maintain the data in the same data format. In these instances, the new record type 204 that is selected may be the same as the existing record type 202. For example, the user may choose to migrate data in data records of record type Alert to records of the same record type. Thus, the data may be maintained in the original data records or migrated to new data records of the same record type (e.g., data format).

In some implementations, the user may choose, for a particular new record type, to use the same name of the existing record type or use the name of the new record type, as shown at 206. For example, as shown at 208, the user may also choose to use the same name for the new record type as the existing record type, Alert.

The user may wish to consolidate data stored within two or more record types in records of a single record type. For example, records of the record type FAQ may be transferred to new records of the record type Tutorial, while existing records of the record type Tutorial are also stored in records of the record type Tutorial. Thus, records of the record type FAQ may be migrated to new records of the record type Tutorial. As shown at 210, in this instance, the new record type is a new name corresponding to the selected record type, Tutorial, rather than the same name as the original record type, FAQ.

In this example, the user selects a record mapping for each of the record types 202. In other implementations, the user need not select a record mapping for those record types 202 that will remain unchanged.

In some implementations, a user may map fields of a source record type to fields of a destination record type. FIG. 3 shows an example of a GUI 300 for facilitating record field mapping, in accordance with some implementations. GUI 300 is configured to present record types 302 of existing data records. The record types 302 may be referred to as source record types. In some implementations, a record type may correspond to an article type. In this example, record types 302 include Alert, Blog, FAQ, How To, Troubleshooting, Tutorial, Video, and Audi. Record types 302 may be presented in the form of a list, menu, tabs, or other suitable presentation.

For each of the record types 302, the system provides a mechanism for a user to customize fields associated with that record type. More particularly, GUI 300 is configured to provide, for each field 304, an indication of a plurality of selectable options for the new field 306. For example, the selectable options may be presented in the form of a drop-down menu. Fields 304 may be referred to as source fields, while new fields 306 may be referred to as destination fields.

For each record type 302, the user may select, for each of the source fields 304 of the record type 302, a corresponding destination field 306 to which data is to be mapped for data migration. Each destination field 306 may be identified by a destination field name. In addition, a destination field 306 may be further identified by its parent record type. In some implementations, the field name may include the name of the record type.

The name of the destination field may be the same as that of the corresponding source field. Alternatively, the name of the destination field may be different from that of the corresponding source field. For example, the name of the destination field may be different from that of the source field where the destination field is a field of a different record type from that of the source record type.

For some record types, the user may wish to maintain the data in the same data format. In these instances, the destination field 306 that is selected may have the same name as the source field 304 from which data is migrated. For example, the field Additional Info of the record type Alert may be migrated to the field Additional Info of the record type Alert.

In this example, the destination field 306 and the corresponding source field 304 from which data is migrated have the same data type 308. In other implementations, it is possible for the destination field 306 to have a different, but compatible data type.

As shown in this example, the user selects a field mapping for each of the record types 302. In other implementations, the user need not select a field mapping for those record types 302 for which the data format will remain unmodified during data migration. In some implementations, where a record type and fields of the record type remain unchanged, the data stored in records of that record type need not be copied or otherwise migrated.

After the user has designated data migration mappings for an organization, at least one data structure may be generated or updated to include a mapping between source record types and destination record types. In addition, the data structure may further include for each source record type, a mapping between each source field and a corresponding destination field.

In the following examples, separate data structures will be described with reference to record type mappings and field mappings. However, these examples are merely illustrative. Therefore, record type mappings and field mappings may also be maintained in a single data structure.

Figure 4A:
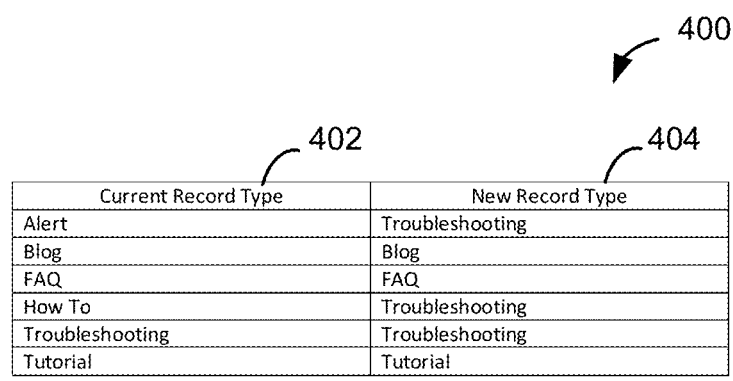
FIG. 4A shows a diagram of an example data structure 400 for mapping source record types to destination record types, in accordance with some implementations.

FIG. 4A shows a diagram of an example data structure 400 for mapping source record types to destination record types, in accordance with some implementations. As shown in FIG. 4A, data structure 400 can map each source record type 402 (i.e., current record type) to a destination record type 404 (i.e., new record type). In this example, a first subset of source record types 402 are identical to the corresponding mapped destination record types 404, while a second subset of source record types 402 are different from the corresponding mapped destination record types 404. More particularly, source record types Blog, FAQ, Trouble-shooting, and Tutorial remain the same, while source record types Alert and How To are mapped to the Troubleshooting record type.

During data migration, data structure 400 is accessed to generate new records of the destination record types 404 to migrate data from records of the corresponding source record types 402. Data in source data records of the source record types 402 is copied or transferred to the new, destination data records of the destination record types 404, as will be described in further detail below.

FIG. 4B shows a diagram of an example data structure 450 for mapping source fields to destination fields, in accordance with some implementations. As shown in FIG. 4B, for each record type 452, a field mapping maps a source field 454 (i.e., current field) to a destination field 456 (i.e., new field). To simplify the illustration, data structure 450 represents a field mapping for a single record type, Alert. The field mapping may further indicate a field type 458 (i.e., data type) corresponding to a source-destination field mapping. In this example, the field type of the source field 454 is identical to the field type of the destination field 456. Example field types include, but are not limited to, text, number, and date/time. In other implementations, the field type of the source field 454 may be compatible with the field type of the destination field 456, but need not be identical to the field type of the destination field 456.

Each destination field 456 may be identified by a field name. In addition, the destination field 456 may be further identified by a parent record type. In this example, each destination field 456 is identified by both the parent record type (e.g., Alert) and the name of the field. For example, a destination field may be identified as Alert.Additional_Info.

In some implementations, the data migration manager accesses data structure(s) that include record and field mappings, and generates new records according to the established record and field mappings. For example, the data migration manager may instantiate the new records as instances of classes representing destination record types and associated fields.

Figure 5:
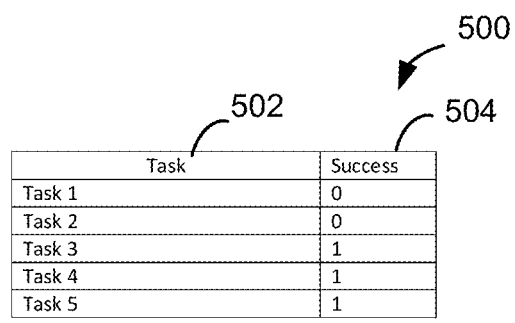
FIG. 5 shows a diagram of an example data structure 500 for tracking the success of data migration tasks, in accordance with some implementations.

During data migration, the status of data migration tasks may be tracked. FIG. 5 shows a diagram of an example data structure 500 for tracking the success of data migration tasks, in accordance with some implementations. Each data migration task 502 may be identified by a task identifier such as an alphanumeric identifier. As shown in this example, the data structure 500 includes an indication of data migration status 504 in association with each corresponding data migration task 502.

In some implementations, the indicator of data migration status is binary, where the indicator indicates that the data migration task has failed (or has not completed successfully) when in a first state, and indicates that the data migration task has successfully completed when in a second state. For example, each indicator may be represented by a bit or flag.

In this example, the data structure 500 is a bit map, where each one of a plurality of bits corresponds to a different one of the tasks 502. Indicators may be initialized with a null value and updated during the migration process.

In some implementations, the data structure 500 may be initialized to indicate a non-completion (e.g., failure) of each of the independent data migration tasks. The status for those tasks that do not successfully complete will continue to indicate that those tasks have not successfully completed. In other words, the data migration status for those tasks that do not successfully complete need not be updated during the data migration process.

In some implementations, a server that successfully executes a data migration task updates the data migration status data structure to reflect the successful execution of the data migration task. In other implementations, the data migration manager is notified by a server of the successful completion of a data migration task and updates the data structure 500 in response to the notification.

The data structure 500 may be accessed by a retry manager and/or undo manager during and/or after completion of data migration. An example of a method for performing data migration in accordance with various implementations will be described in further detail below with reference to FIG. 6.

Figure 6:
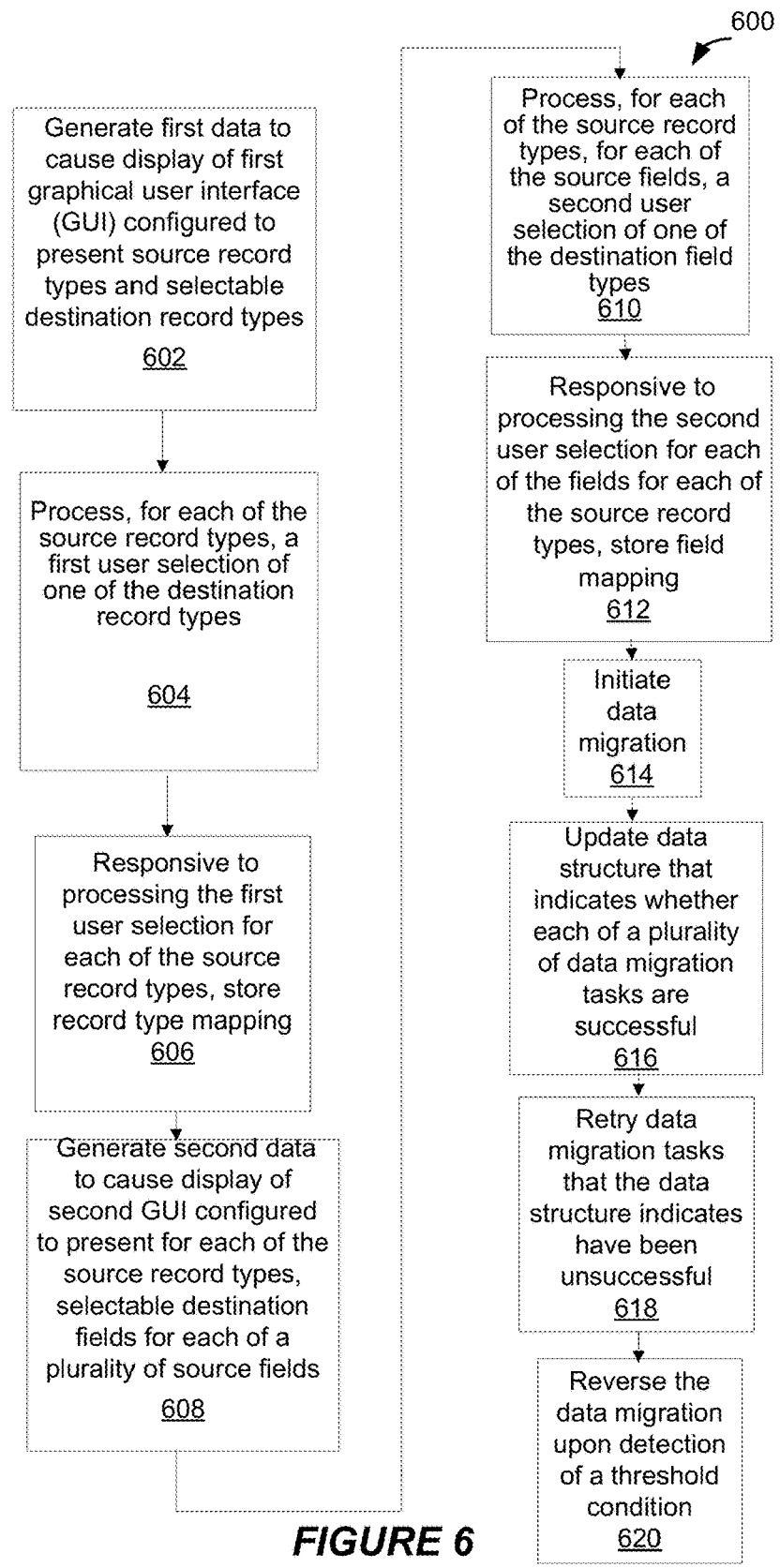
FIG. 6 shows an example of a method 600 for performing data migration, in accordance with some implementations.

FIG. 6 shows an example of a method 600 for performing data migration, in accordance with some implementations. A user responsible for configuring data migration mappings logs into the organization's web site. The user then accesses a data migration web page.

A database system generates first data capable of being processed by a client device to cause display of a first graphical user interface (GUI) at 602. More particularly the first GUI is configured to present, for each of a plurality of source record types, a first plurality of user selectable options indicating a plurality of destination record types. For example, the options may be presented via a list, drop-down menu, tabs, or other user interface elements.

In some implementations, the user selects one of the user selectable options for each of the source record types. In other implementations the user may rely upon default values and submit a selection of one of the user selectable options only for those source record types that will be mapped to a record type that is different the source record type.

The system processes, for each of the source record types, the user selection of one of the user selectable options indicating a corresponding one of the destination record types at 604. Responsive to processing the user selection for each of the source record types, the system stores, in one or more databases of the database system, a record type mapping that associates each of the source record types with a corresponding one of the destination record types at 606.

In some implementations, the system enables users to select field mappings for fields of each of the source record types. In this example, the user selects field mappings for each of the source record types. In other implementations the user may rely upon default values and submit a selection of one of the user selectable options only for those source fields that will be mapped to a field that is different the source field.

In accordance with various implementations, the system generates second data capable of being processed by the client device to cause display of a second GUI at 608. More particularly, the second GUI is configured to present, for each of the source record types, for each one of a corresponding plurality of source fields, a plurality of user selectable options indicating a plurality of destination fields. The options may be presented via one or more user interface elements with which a user may interact to submit his or her selections. For example, the options may be presented via a list, drop-down menu, or tabs.

The system processes, for each of the source record types, for each of the corresponding source fields, a user selection of one of the user selectable options indicating a corresponding bone of the destination fields at 610. Responsive to processing the user selection for each of the source fields for each of the source record types, the system stores, in the databases of the database system, for each of the source record types, a field mapping that associates each of the source fields with a corresponding one of the destination fields at 612.

After the user has established the desired data migration mappings, the user can submit a request to initiate data migration. The system then proceeds with the data migration at 614 using the data migration mappings that have been established.

To perform data migration, the system can generate destination data records to which data may be copied or transferred from the source data records. More particularly, for each of a plurality of source data records stored in the databases of the database system, the system may generate a corresponding one of a plurality of destination data records using the data migration mappings (e.g., record type mapping, field mapping) and store the destination data records in the databases of the database system.

The system may perform data migration for each of the source data records. However, data migration may not be successful for each of the source data records. Thus, for at least a portion of the source data records, for each of the source fields of the source data record, record data is migrated from the source field to a corresponding one of the destination fields of the corresponding destination data record. The record data may be migrated by copying or transferring the record data from the source field to the corresponding destination field.

In accordance with some implementations, the system migrates metadata such as application settings. These settings can be maintained in association with a record type and/or in association with specific fields of a record type. Examples of metadata include, but are not limited to, page layout settings and track change settings.

Page layout settings can control which fields of a record can be displayed, based on factors such as user role, if a user attempts to view the record from a web browser. For example, the page layout of an existing record type (e.g., FAQ) may indicate that user A can view fields X, Y, and Z of the record type, but cannot other fields of the record type. The system may migrate the page layout settings to the new record type so that after data migration is completed, the same user A can only view fields X, Y, and Z of the corresponding new, migrated data record.

Track change settings can indicate whether a source field is marked for a track change. If a source field of an existing data record is marked for a track change, after data migration, any changes to data in the source field of the corresponding new, migrated data record will be automatically tracked.

During data migration, the system updates a data structure in real-time at 616 with a data migration status for each of a plurality of data migration tasks, where each of the data migration tasks corresponds to a different subset of the source data records. In accordance with some implementations, the data migration status for each of the data migration tasks indicates that the data migration task has failed when in a first state and has successfully completed when in a second state. For example, the data structure may be implemented in the form of a bit map, where each bit in the bit map corresponds to a different data migration task. In accordance with various implementations, a retry manager operates to automatically retry data migration tasks that the data structure indicates have failed at 618. More particularly, during data migration, the retry manager accesses the data structure and identifies from the data structure data migration task(s) that have failed. Responsive to identifying a data migration task that has failed, the retry manager repeats the data migration task for the corresponding subset of the source data records.

In addition, an undo manager is configured to undo (e.g., reverse) the data migration as shown at 620. More particularly, the undo manager may operate to undo the data migration in response to a user-submitted request. Alternatively, the undo manager may operate automatically to reverse the data migration for each of the destination data records in response to detecting a threshold condition.

Reversal of the data migration is performed such that the record data stored or referenced in the destination data records is stored or referenced in the source data records. More particularly, the data migration can be reversed for one of the destination data records by copying or transferring the record data from one of the destination fields of the destination data record to a corresponding source field of a corresponding one of the source data records.

In some implementations, the record data itself can include a pointer. For example, record data associated with a particular feed can include a significant amount of text. It would take a significant amount of memory to copy the entire feed text from a source field to a destination field. By storing a pointer to the feed text in the source field, it is possible to transfer the pointer to the feed text to the destination field. When the data migration is reversed, the pointer may simply be transferred from the destination field to the source field.

The undo manager may operate to detect threshold conditions in real-time during data migration. In addition, the undo manager may operate to detect threshold conditions after data migration has completed or otherwise halted.

A threshold condition may be ascertained from data migration statistics and/or the migration status of the data migration tasks. Thus, the undo manager may access data migration statistics and/or the data structure that maintains the migration status of the data migration tasks to determine whether a threshold condition exists.

As described above, a threshold condition may be detected using a set of rules. Each rule may include a condition that, when met, indicates that a threshold condition exists. A threshold condition may be detected upon determining that a rule is satisfied. A rule may be composed using one or more conditions, where each condition includes one or more operators (e.g., <, >, =, AND, OR) and one or more parameters. The parameters can include, but are not limited to, one or more data migration statistics, data migration status information associated with data migration tasks, and/or a time that has passed since the start of the data migration process. For example, the undo manager may detect a threshold condition when a data migration time exceeds a threshold time, the number of data migration tasks that have failed exceeds a threshold number, or the percentage of data migration tasks that have failed exceeds a threshold percentage In some implementations, the undo manager is communicatively coupled with the retry manager. For example, the retry manager may instruct the undo manager to reverse the data migration if the retry manager ascertains that retrying a particular number or percentage of data migration tasks has failed. As another example, the undo manager may instruct the retry manager to discontinue operation upon ascertaining that the data migration has not completed and the expired data migration time has exceeded a threshold time period.

After data migration is successfully completed, the original source data records can be deleted. Similarly, after data migration reversal is completed, the destination data records can be deleted. Records can be deleted by flagging the records as deleted. For example, a record can be marked as deleted by deleting a pointer to the record. During execution of a disk cleanup utility, memory consumed by flagged data records can be released.

Upon flagging the records as deleted, a message can be logged or transmitted. For example, a message can be transmitted to an administrator. A message can indicate that deletion of the original data records or destination data records is successful.

Some but not all of the techniques described or referenced herein are implemented using or in conjunction with a social networking system. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in a database system. In some but not all implementations, the disclosed methods, apparatus, systems, and computer program products may be configured or designed for use in a multi-tenant database environment. In accordance with various implementations, each tenant may implement a corresponding file deletion policy. A file deletion policy may be implemented by a single tenant or multiple tenants.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can be otherwise generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 7A:
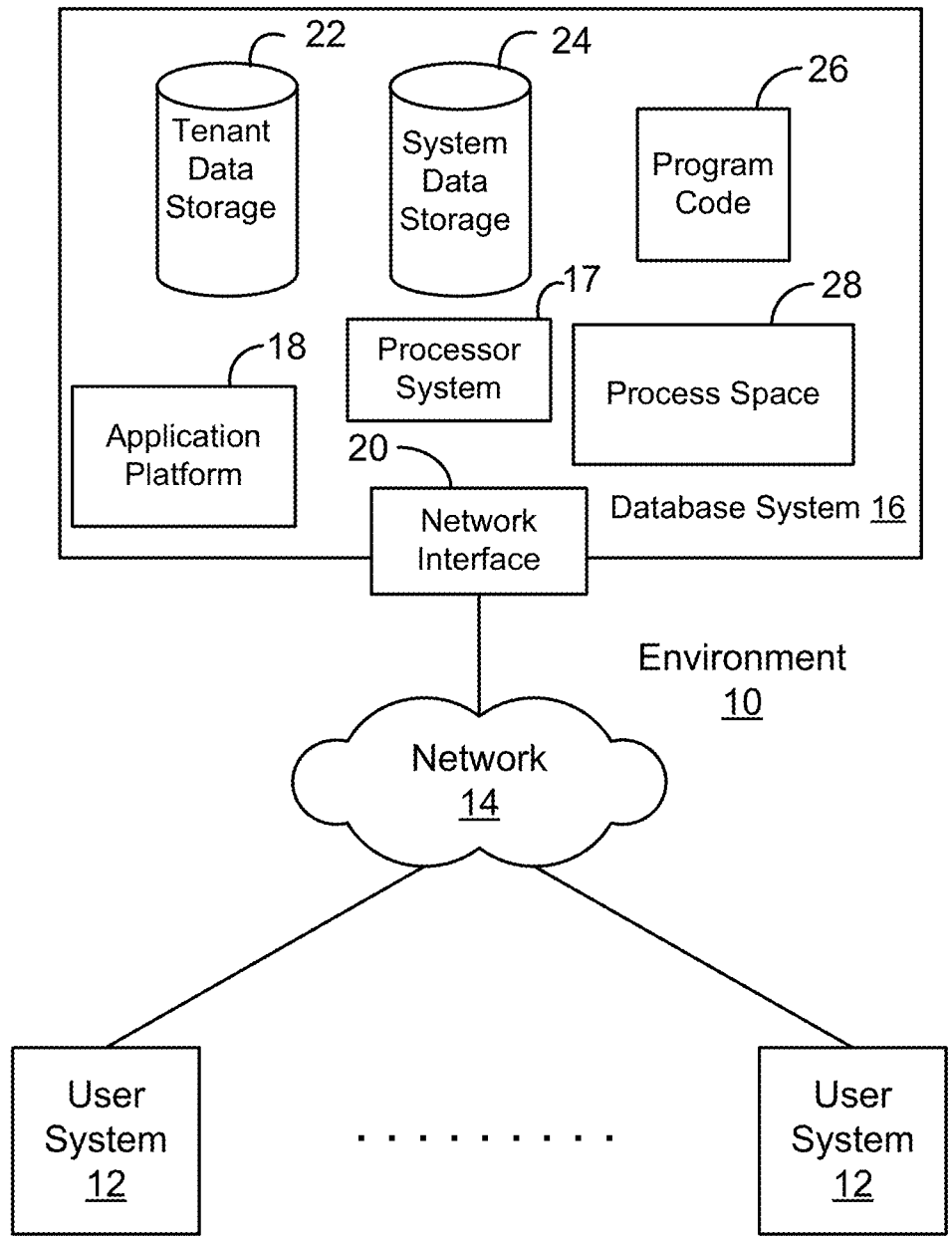
FIG. 7A shows a block diagram of an example of an environment 10 in which an on-demand database service can be used in accordance with some implementations.

FIG. 7A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 7A (and in more detail in FIG. 7B) user systems 12 might interact via a network 14 with an on-demand database service, which is implemented in the example of FIG. 7A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 7A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7B:
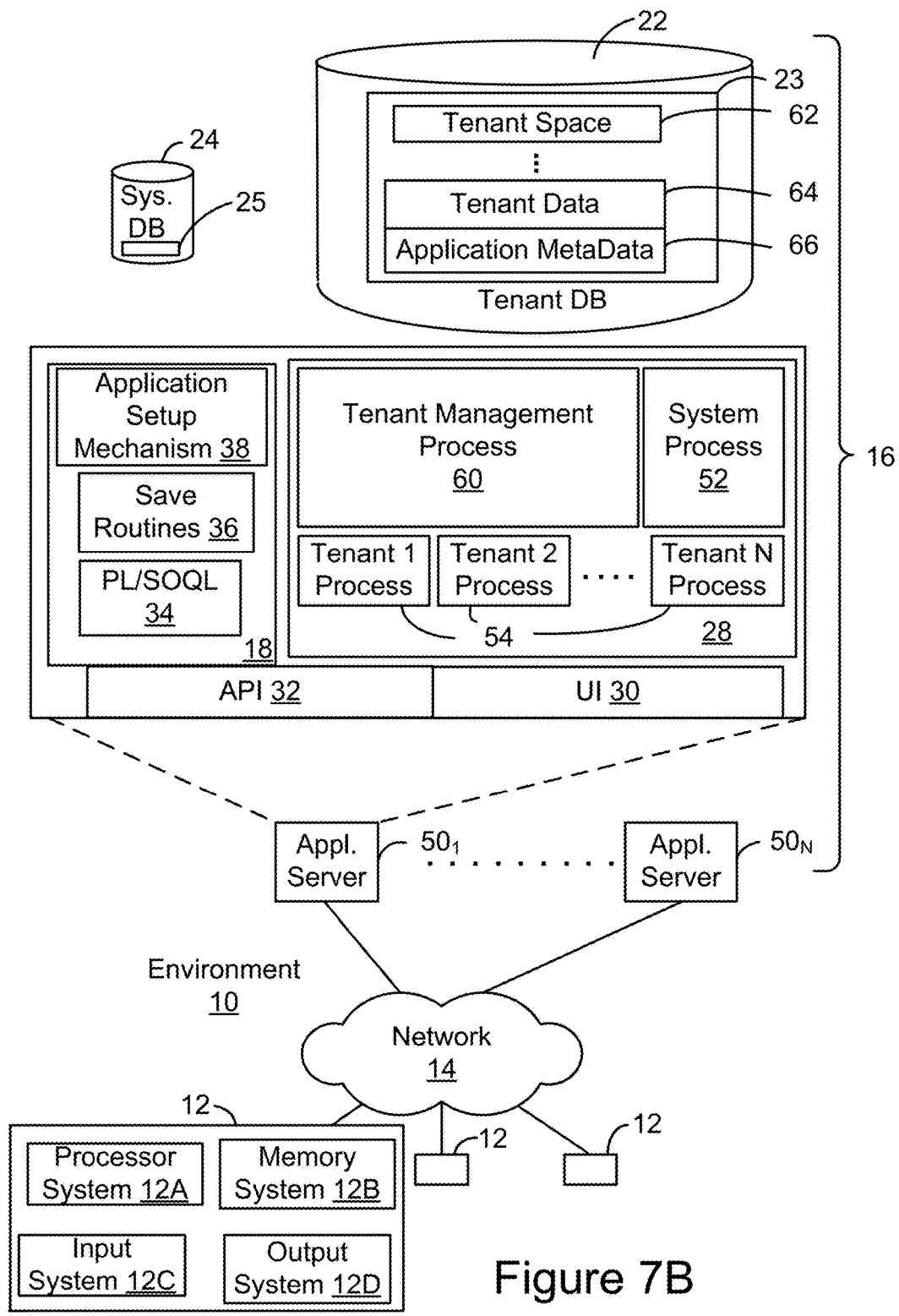
FIG. 7B shows a block diagram of an example of some implementations of elements of FIG. 7A and various possible interconnections between these elements.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 7A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 7B shows a block diagram of an example of some implementations of elements of FIG. 7A and various possible interconnections between these elements. That is, FIG. 7B also illustrates environment 10. However, in FIG. 7B elements of system 16 and various interconnections in some implementations are further illustrated. FIG. 7B shows that user system 12 may include processor system 12A, memory system 12B, input system 12C, and output system 12D. FIG. 5B shows network 14 and system 16. FIG. 5B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 7A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 7B, system 16 may include a network interface 20 (of FIG. 7A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 8A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 8B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 8A and 8B.

FIG. 8B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 7B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 8B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 7A, 7B, 8A and 8B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 5A and 5B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 7A, 7B, 8A and 8B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system, the database system configurable to cause:
generating first data capable of being processed by a client device to cause display of a first graphical user interface (GUI) configured to present, for each one of a plurality of source record types, a first plurality of user selectable options indicating a plurality of destination record types;
processing, for each of the source record types, a first user selection of one of the first plurality of user selectable options indicating a corresponding one of the destination record types;
responsive to processing the first user selection for each of the source record types, storing, in at least one database of the database system, a record type mapping that associates each of the source record types with a corresponding one of the destination record types;
generating second data capable of being processed by the client device to cause display of a second GUI configured to present, for each of the source record types, for each one of a corresponding plurality of source fields, a second plurality of user selectable options indicating a plurality of destination fields;
processing, for each of the source record types, for each of the corresponding source fields, a second user selection of one of the second plurality of user selectable options indicating a corresponding one of the destination fields;
responsive to processing the second user selection for each of the source fields for each of the source record types, storing, in the at least one database of the database system, for each of the source record types, a field mapping that associates each of the source fields with a corresponding one of the destination fields;
for each one of a plurality of source data records stored in the at least one database of the database system:
generating a corresponding one of a plurality of destination data records using the record type mapping and the field mapping, and
storing the destination data records in the at least one database of the database system;
performing data migration including, for each of at least a portion of the source data records, for each one of the source fields of the source data record, migrating record data from the source field to a corresponding one of the destination fields of the corresponding destination data record, the migrating including copying or transferring the record data from the source field to the corresponding destination field;
during data migration, updating a data structure with a data migration status for each of a plurality of data migration tasks, each of the data migration tasks corresponding to a different subset of the source data records, the data migration status for each of the data migration tasks indicating that the data migration task has failed when in a first state and has successfully completed when in a second state;
identifying from the data structure at least one of the data migration tasks that has failed;
responsive to identifying the data migration task that has failed, repeating the data migration for the corresponding subset of the source data records; and
responsive to detecting a threshold condition, reversing the data migration for each of the destination data records such that the record data stored in the destination data records is stored in the source data records.

2. The system as recited in claim 1, the database system further configurable to cause:
reversing the data migration for at least one of the destination data records by copying or transferring the record data from one of the destination fields of the destination data record to a corresponding source field of a corresponding one of the source data records.

3. The system as recited in claim 1, the database system further configurable to cause:
reversing the data migration for at least one of the destination data records by copying or transferring a pointer from one of the destination fields of the destination data record to a corresponding source field of a corresponding one of the source data records.

4. The system as recited in claim 1, the database system further configurable to cause updating the data structure such that each one of a plurality of bits indicates the data migration status of a corresponding one of the data migration tasks.

5. The system as recited in claim 1, the database system further configurable to cause detecting the threshold condition based at least, in part, on data migration statistics collected during the data migration, the data migration statistics including one or more of:
   a data migration time indicating a time that has expired since the data migration was initiated;
   a number of the data migration tasks that have failed to successfully complete;
   a number of the data migration tasks that have successfully completed;
   a percentage of the data migration tasks that have failed to successfully complete; or
   a percentage of the data migration tasks that have successfully completed.

6. The system as recited in claim 1, the database system further configurable to cause:
   detecting the threshold condition by applying a set of rules in real-time during the data migration.

7. The system as recited in claim 1, the database system further configurable to cause:
   monitoring the data structure in real-time during the data migration to determine whether any of the data migration tasks has failed.

8. A computer program product comprising computer-readable program code capable of being executed by one or more processors when retrieved from a non-transitory computer-readable medium, the program code comprising computer-readable instructions configurable to cause: generating first data capable of being processed by a client device to cause display of a first graphical user interface (GUI) configured to present, for each one of a plurality of source record types, a first plurality of user selectable options indicating a plurality of destination record types;
   processing, for each of the source record types, a first user selection of one of the first plurality of user selectable options indicating a corresponding one of the destination record types;
   responsive to processing the first user selection for each of the source record types, storing, in at least one database of a database system, a record type mapping that associates each of the source record types with a corresponding one of the destination record types;
   generating second data capable of being processed by the client device to cause display of a second GUI configured to present, for each of the source record types, for each one of a corresponding plurality of source fields, a second plurality of user selectable options indicating a plurality of destination fields;
   processing, for each of the source record types, for each of the corresponding source fields, a second user selection of one of the second plurality of user selectable options indicating a corresponding one of the destination fields;
   responsive to processing the second user selection for each of the source fields for each of the source record types, storing, in the at least one database of the database system, for each of the source record types, a field mapping that associates each of the source fields with a corresponding one of the destination fields;
   for each one of a plurality of source data records stored in the at least one database of the database system:
      generating a corresponding one of a plurality of destination data records using the record type mapping and the field mapping, and
      storing the destination data records in the at least one database of the database system;
   performing data migration including, for each of at least a portion of the source data records, for each one of the source fields of the source data record, migrating record data from the source field to a corresponding one of the destination fields of the corresponding destination data record, the migrating including copying or transferring the record data from the source field to the corresponding destination field;
   during data migration, updating a data structure with a data migration status for each of a plurality of data migration tasks, each of the data migration tasks corresponding to a different subset of the source data records, the data migration status for each of the data migration tasks indicating that the data migration task has failed when in a first state and has successfully completed when in a second state;
   identifying from the data structure at least one of the data migration tasks that has failed;
   responsive to identifying the data migration task that has failed, repeating the data migration for the corresponding subset of the source data records; and
   responsive to detecting a threshold condition, reversing the data migration for each of the destination data records such that the record data stored in the destination data records is stored in the source data records.

9. The computer program product as recited in claim 8, the program code comprising instructions further configured to cause:
   reversing the data migration for at least one of the destination data records by copying or transferring the record data from one of the destination fields of the destination data record to a corresponding source field of a corresponding one of the source data records.

10. The computer program product as recited in claim 8, the program code comprising instructions further configured to cause:
   reversing the data migration for at least one of the destination data records by copying or transferring a pointer from one of the destination fields of the destination data record to a corresponding source field of a corresponding one of the source data records.

11. The computer program product as recited in claim 8, the program code comprising instructions further configured to cause:
   updating the data structure such that each one of a plurality of bits indicates the data migration status of a corresponding one of the data migration tasks.

12. The computer program product as recited in claim 8, the program code comprising instructions further configured to cause:
   detecting the threshold condition based at least, in part, on data migration statistics collected during the data migration, the data migration statistics including one or more of:
      a data migration time indicating a time that has expired since the data migration was initiated;
      a number of the data migration tasks that have failed to successfully complete;
      a number of the data migration tasks that have successfully completed;
      a percentage of the data migration tasks that have failed to successfully complete; or a percentage of the data migration tasks that have successfully completed.

13. The computer program product as recited in claim 8, the program code comprising instructions further configured to cause:
detecting the threshold condition by applying a set of rules in real-time during the data migration.

14. The computer program product as recited in claim 8, the program code comprising instructions further configured to cause:
monitoring the data structure in real-time during the data migration to determine whether any of the data migration tasks has failed.

15. A method, comprising:
generating first data capable of being processed by a client device to cause display of a first graphical user interface (GUI) configured to present, for each one of a plurality of source record types, a first plurality of user selectable options indicating a plurality of destination record types;
processing, for each of the source record types, a first user selection of one of the first plurality of user selectable options indicating a corresponding one of the destination record types;
responsive to processing the first user selection for each of the source record types, storing, in at least one database of a database system, a record type mapping that associates each of the source record types with a corresponding one of the destination record types;
generating second data capable of being processed by the client device to cause display of a second GUI configured to present, for each of the source record types, for each one of a corresponding plurality of source fields, a second plurality of user selectable options indicating a plurality of destination fields;
processing, for each of the source record types, for each of the corresponding source fields, a second user selection of one of the second plurality of user selectable options indicating a corresponding one of the destination fields;
responsive to processing the second user selection for each of the source fields for each of the source record types, storing, in the at least one database of the database system, for each of the source record types, a field mapping that associates each of the source fields with a corresponding one of the destination fields;
for each one of a plurality of source data records stored in the at least one database of the database system:
generating a corresponding one of a plurality of destination data records using the record type mapping and the field mapping, and
storing the destination data records in the at least one database of the database system;
performing data migration including, for each of at least a portion of the source data records, for each one of the source fields of the source data record, migrating record data from the source field to a corresponding one of the destination fields of the corresponding destination data record, the migrating including copying or transferring the record data from the source field to the corresponding destination field;
during data migration, updating a data structure with a data migration status for each of a plurality of data migration tasks, each of the data migration tasks corresponding to a different subset of the source data records, the data migration status for each of the data migration tasks indicating that the data migration task has failed when in a first state and has successfully completed when in a second state;
identifying from the data structure at least one of the data migration tasks that has failed;
responsive to identifying the data migration task that has failed, repeating the data migration for the corresponding subset of the source data records; and
responsive to detecting a threshold condition, reversing the data migration for each of the destination data records such that the record data stored in the destination data records is stored in the source data records.

16. The method as recited in claim 15, further comprising:
reversing the data migration for at least one of the destination data records by copying or transferring the record data from one of the destination fields of the destination data record to a corresponding source field of a corresponding one of the source data records.

17. The method as recited in claim 15, further comprising:
reversing the data migration for at least one of the destination data records by copying or transferring a pointer from one of the destination fields of the destination data record to a corresponding source field of a corresponding one of the source data records.

18. The method as recited in claim 15, further comprising:
updating the data structure such that each one of a plurality of bits indicates the data migration status of a corresponding one of the data migration tasks.

19. The method as recited in claim 15, further comprising:
detecting the threshold condition based at least, in part, on data migration statistics collected during the data migration, the data migration statistics including one or more of:
a data migration time indicating a time that has expired since the data migration was initiated;
a number of the data migration tasks that have failed to successfully complete;
a number of the data migration tasks that have successfully completed;
a percentage of the data migration tasks that have failed to successfully complete; or
a percentage of the data migration tasks that have successfully completed.

20. The method as recited in claim 15, further comprising:
detecting the threshold condition by applying a set of rules in real-time during the data migration.

* * * * *